United States Patent [19]

Schultz

[11] 4,300,752
[45] Nov. 17, 1981

[54] HOG LOT GATE

[76] Inventor: Daryl A. Schultz, R. R. 2, Box 92-A, Rensselaer, Ind. 47979

[21] Appl. No.: 121,201

[22] Filed: Feb. 13, 1980

[51] Int. Cl.³ ............................................. E04H 17/16
[52] U.S. Cl. ........................................ 256/73; 49/381
[58] Field of Search .............. 256/73; 119/20; 49/381, 49/396

[56] References Cited

U.S. PATENT DOCUMENTS

| | | | |
|---|---|---|---|
| 2,245,826 | 6/1941 | Rowe | 256/73 |
| 2,659,168 | 11/1953 | Kaplan | 49/381 |
| 2,809,017 | 10/1957 | Fou Wong | 256/73 |
| 3,022,045 | 2/1962 | Silvers | 256/73 |

Primary Examiner—Andrew V. Kundrat
Attorney, Agent, or Firm—Beveridge, DeGrandi, Kline, Lunsford

[57] ABSTRACT

A hog lot gate has top and bottom rails made of stainless steel, with a wide central portion, tapered in width and height towards both ends. The top surface of each rail has sloping crown faces and depending side walls to allow corrosive material to slide off the sides.

7 Claims, 5 Drawing Figures

HOG LOT GATE

BACKGROUND OF THE INVENTION

The present invention relates to an improved gate for hog feed lots. In the improved gate, certain disadvantages of conventional gates have been obviated.

Heretofore, gates used for penning pigs and hogs have generally been made of mild steel and had two horizontal rails, one top and one bottom, and a series of vertical slats therebetween. There have also been mild steel rails having vertical end posts and horizontal intermediate slats.

Such mild steel rails have been found to be unsatisfactory due to their vulnerability to corrosion. The use in hog feed lots exposes these mild steel rails to corrosive action, not only of the weather, but also the feed and manure of the hogs.

In order to increase the lifetime of the gates, it has been proposed to make the gates out of stainless steel, which would be more corrosion-resistant than mild steel. However, in order to make hog feed lot gates out of stainless steel in the designs heretofore thought necessary, the amount of stainless steel required made their cost competitivetly prohibitive.

Accordingly, there is a need in the art for a new gate construction allowing the manufacture of gates from stainless steel, using a minimum of stainless steel, yet adequately strong for the purpose intended.

SUMMARY OF THE INVENTION

The present invention fulfills this need in the art by providing an improved hog feed lot gate having top and bottom rails in substantially spaced apart parallel relation, left and right end posts, and a series of slats substantially parallel to and between the end posts, spanning the top and bottom rails. The top and bottom rails each have a left half and a right half, extending from a central portion of the rail to the left end and the right end, respectively. Each half is tapered in width and height from the central portion of the rail to the rail end, and has a pair of crown walls sloping outwardly towards either side of the gate. The crown wall has a depending vertical side wall along its length. The preferred material is stainless steel. The slats may be made of stainless steel tubing flattened to an oval and welded to the top and bottom rail.

DETAILED DESCRIPTION OF THE DRAWINGS

Figure 5:
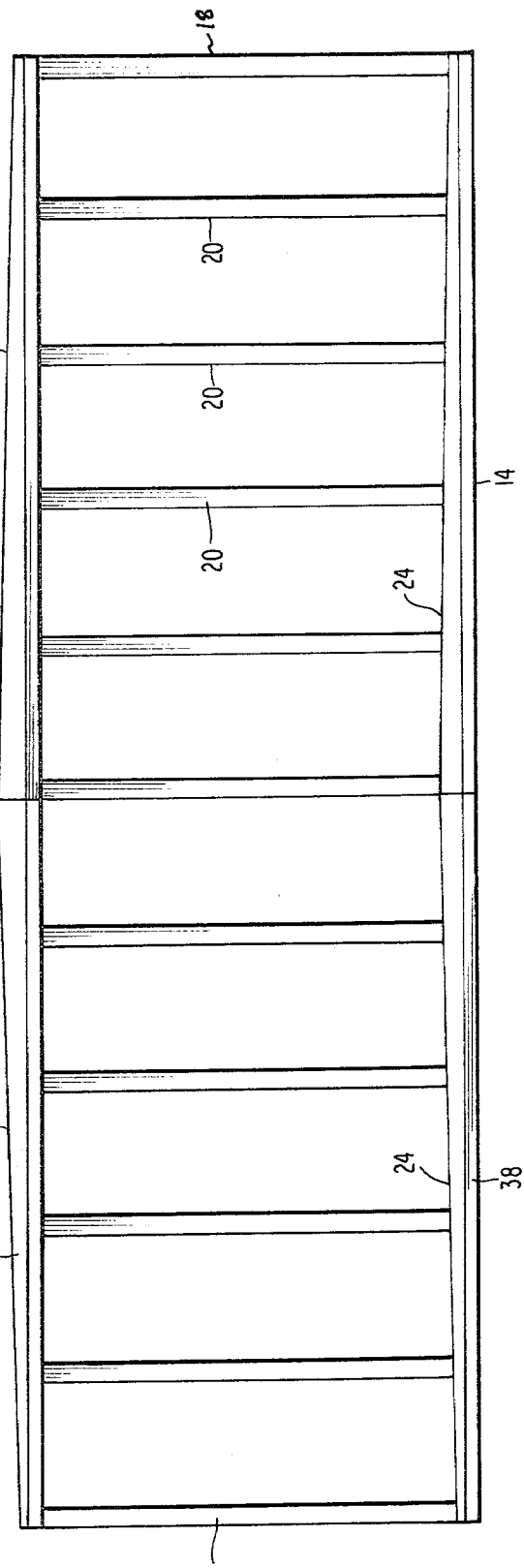
FIG. 5 is a front view of the assembled hog feed lot gate according to the invention.

As seen in FIG. 5, the assembled hog feed lot gate has top and bottom rails 12 and 14, end posts 16 and 18 and vertical slats 20.

Rails 12 and 14 are each made in substantially the same way, so a description of one will be understood as a description of the other. The rails are made in halves and then welded together to make the entire rails.

Figure 1:
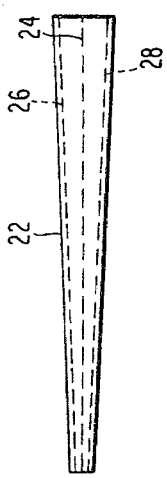
FIG. 1 is a top plan view of a stainless steel blank cut to the proper shape for fabrication into one half of a top or bottom rail.

As shown in FIG. 1, a sheet of stainless steel, preferably 14 to 16 gauge, is cut into a trapezoidal blank 22. It is understood that one of the advantages of this construction is the savings in manufacturing in that a multiplicity of blanks can be cut from a single sheet of stainless steel with the narrow end of each cut out blank adjacent to the wide end of both of its neighbors. Preferably, the blank has a length of 60", its narrow end has a width of 2" and its wide end a width of 4". It will be understood that variations in these dimensions can be readily made.

Figure 2:
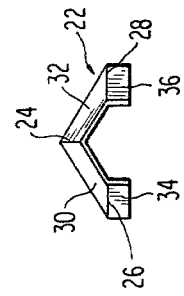
FIG. 2 is an end view of the blank shown in FIG. 1 bent into its final shape.
Figure 3:
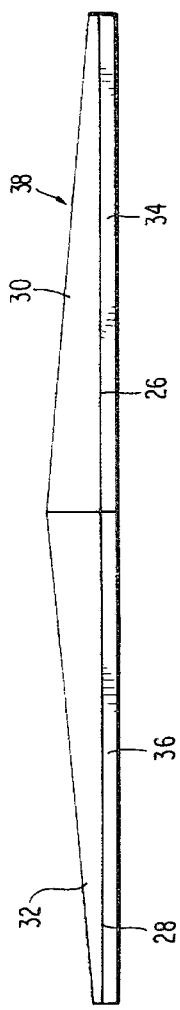
FIG. 3 is a side view of two half rails welded together.
Figure 4:
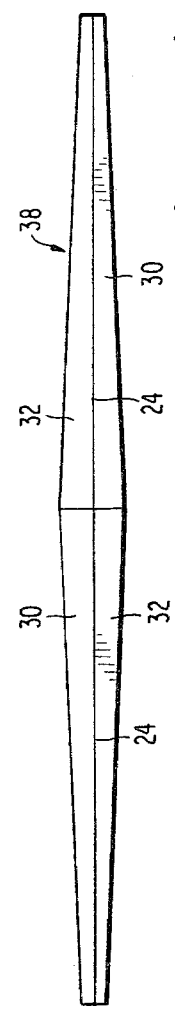
FIG. 4 is a top view of two half rails welded together.

After the blank 22 of FIG. 1 is cut, it is folded along central line 24 to form an obtuse angle. Blank 22 is further folded along lines 26 and 28 to form depending side walls. Thus, the blank is folded to form crown slopes 30 and 32 and side walls 34 and 36 (FIG. 2). Side walls 34 and 36 are such that in the final installation, they will preferably be substantially perpendicular to the ground. All blanks are made in this fashion whether they are to be for top or bottom rails or for right or left hand halves. Two such blanks are then welded together at their wide ends to result in an entire rail 38 having the configuration shown in FIGS. 3 and 4. Preferably, the thickness of the blank should be such as to permit bending or folding using conventional metal fabricating equipment.

Two completed rails 38 are laid parallel to one another so that their sloping crowns both point in the same direction, which is to be the top direction of the completed gate. End posts 16 and 18 are welded or otherwise rigidly secured to each of the two rails 38, and a series of spaced vertical slats 20 are likewise welded to each of the rails 38.

Savings in the costs of the gates can be realized by providing slats 20 of modified tubular stainless steel. The cylindrical tubular stock can be compressed so its cross-section is elliptical rather than circular. If the slats are installed so that the major axis of the ellipse is parallel with rails 38, then the spacing between adjacent slats is decreased, and the slats need not be positioned as closely together as would be the case with strictly circular cross-sections. Over a lengthy span, the oval shape can result in a savings of an entire slat. It is understood that the space between adjacent slats depends on the use to which the completed gate is to be put. When housing piglets, of course, the slats need to be closer together to prevent the piglets from escaping between the slats. For more mature hogs, a wider, therefore less expensive spacing, is sufficient.

The orientation of the rails as above indicated is important for the purpose of providing structural strength. Also, by providing the sloping crowns, any material that would have a tendency to cause corrosion will slide off and not deteriorate the gate.

Although the vertical slats 20 have been heretofore described as being welded to rails 38, it is understood that other affixation methods can also be employed. Particularly, holes can be cut in rails 38 and tabs formed on slats 20 to interfit through the cut holes, and then lapped over to secure slats 20 to rails 38.

EXAMPLE 1

When manufacturing a gate according to the preferred dimensions stated above (i.e., each blank having a length of 60", a wide end width of 4", a narrow end width of 2", and being formed of 14 gauge stainless steel), the completed rail was 10 feet long. It has been found that an 800 lb. load can be safely supported in the middle of the 10 foot span.

The gate made according to Example 1 has been found to be two to four times stronger than conventional gates made of mild steel. Furthermore, mild steel gates have been found to have a lifetime of only about 5 years, whereas a gate made according to the present invention should last much longer due to the invulnerability of the stainless steel to corrosion.

Thus, there has been described a hog lot feeding gate which has the advantage of a substantially longer lifetime than conventional gates, but which is economically competitive therewith.

What is claimed is:

1. A hog lot gate comprising
a top rail and a bottom rail, said rails being in substantially parallel spaced apart relation and having left and right halves extending from a central portion of said rails to the ends of said rails,
an end post at each end of said rails substantially perpendicular thereto, spanning the distance between said rails, and vertical slats substantially parallel to said end posts and spaced therebetween, wherein said rail halves are tapered from a wide extremity at said central portion to a narrow extremity at said rail end, both in height and width, and include a pair of sloping crown faces and a pair of depending side walls.

2. A hog lot gate as claimed in claim 1, wherein said sloping crown faces of both said top and bottom rails slope from the direction of said top rail toward said bottom rail outwardly of the sides of said gate.

3. A hog lot gate as claimed in claim 2, wherein said side walls are substantially vertical.

4. A hog lot gate as claimed in claim 1, wherein said vertical slats comprise tubular members of elliptical cross-section and said slats are installed with the major axis of said elliptical section substantially parallel to said rails.

5. A hog lot gate as claimed in claim 1, 2, 3 or 4, wherein said gate is made of stainless steel.

6. A top rail for a hog lot gate comprising right and left halves extending from the center of said rail to the ends of said rail, wherein said rail halves are tapered from a wide extremity at said rail center to a narrow extremity at said rail end, both in height and width, and include a pair of sloping crown faces and a pair of depending side walls.

7. A top rail as claimed in claim 6, wherein said rail is made of stainless steel.

* * * * *